United States Patent [19]
Arai

[11] Patent Number: 5,687,822
[45] Date of Patent: Nov. 18, 1997

[54] ELECTROMAGNETIC SPRING CLUTCH

[75] Inventor: Shigeharu Arai, Gunma, Japan

[73] Assignee: Ogura Clutch Co., Ltd., Japan

[21] Appl. No.: 613,131

[22] Filed: Mar. 8, 1996

[30] Foreign Application Priority Data

Mar. 8, 1995 [JP] Japan ........................ 077308

[51] Int. Cl.$^6$ ........................ F16D 27/105
[52] U.S. Cl. ........................ 192/84.81; 192/81 C
[58] Field of Search ........................ 192/84.81, 84.8, 192/84.96, 35, 40, 81 C; 310/105; 335/281, 272, 297

[56] References Cited

U.S. PATENT DOCUMENTS

| | | | |
|---|---|---|---|
| 2,465,982 | 3/1949 | Winther et al. | 310/105 |
| 3,974,902 | 8/1976 | Wahlstedt et al. | 192/84.81 |
| 4,263,995 | 4/1981 | Wahlstedt | 192/84.81 X |
| 4,460,076 | 7/1984 | Yamada . | |
| 4,638,899 | 1/1987 | Kossett | 192/84.81 X |
| 5,031,744 | 7/1991 | Nishimura | 192/84.81 X |
| 5,090,538 | 2/1992 | Osawa | 192/84.81 |
| 5,099,974 | 3/1992 | Spechko | 192/35 X |

FOREIGN PATENT DOCUMENTS

| | | |
|---|---|---|
| 57-186627 | 11/1982 | Japan . |
| 62-22009 | 5/1987 | Japan . |
| 62-22010 | 5/1987 | Japan . |

Primary Examiner—Rodney H. Bonck
Attorney, Agent, or Firm—Blakely, Sokoloff, Taylor & Zafman

[57] ABSTRACT

An electromagnetic spring clutch includes a stator, an excitation coil, an input-side rotating member, an output-side rotating member, a coil spring, and a rotor. A central hole is formed in the stator. The central hole has an inner circumferential surface formed by a plurality of magnetic pole segments that mesh each other alternately through a gap in circumferential and axial directions. The excitation coil is accommodated in the stator. The input- and output-side rotating members are made of a non-magnetic member and formed with fitting portions and coil tight-winding surfaces. The fitting portions respectively support the two open end portions of the central hole of the stator, and the coil tight-winding surfaces have end portions that oppose each other in the central hole. The coil spring is wound on the coil tight-winding surfaces of the two rotating members and has one end hooked by the input-side rotating member. The other end of the coil spring is hooked by the rotor disposed in the magnetic field of the stator. The rotor is made of a hysteresis material.

5 Claims, 4 Drawing Sheets

ELECTROMAGNETIC SPRING CLUTCH

FIELD OF THE INVENTION

The present invention relates to an air gap type electromagnetic spring clutch.

In an electromagnetic spring clutch, a coil spring is wound on the coil tight-winding surfaces of its rotating members serving as the power input and output sides, respectively, and one end of the coil spring is hooked by the input-side rotating member. The other end of the coil spring is hooked by a rotor disposed in the magnetic field of the stator. When the excitation coil of the stator is energized, the rotor is braked without being frictionally engaged with the output-side rotating member, so that the coil spring is tightly wound on the coil tight-winding surfaces of the input- and output-side rotating members, respectively, thereby integrally rotating the two rotating members.

As an air gap type electromagnetic spring clutch of this type, one is available in which a rotor made of copper or an aluminum alloy is arranged to oppose the magnetic pole surfaces of a stator. A plurality of excitation coils are disposed in the circumferential direction of the stator. Due to the magnetic flux generated upon energization of the excitation coils of the stator, an electromagnetic force acts on the rotor in a direction opposite to the rotational direction of the input-side rotating member which is rotated by an eddy current. When the rotor is braked by this electromagnetic force, the coil spring is tightly wound on the coil tight-winding surfaces of the input- and output-side rotating members (see Japanese Patent Publication No. 62-22010).

Another air gap type electromagnetic spring clutch is proposed which has a rotor disposed with magnetic induction coils, which are different in number from those of the stator, in its circumferential direction (see U.S. Pat. No. 4,460,076).

In these conventional air gap type electromagnetic spring clutches, the rotor is arranged to oppose the magnetic pole surfaces of the stator through an air gap in the axial direction. These stator and rotor, and the input-side rotating member and the output-side rotating member are sequentially disposed in the axial direction. The rotor is supported by the stator through a bearing, and the input-side rotating member is rotatably supported by the rotating shaft through a bearing. It is difficult to decrease the weight and size of such an electromagnetic spring clutch and mount it in a machine.

In an electromagnetic spring clutch, the rotor of which uses magnetic induction coils, many excitation coils and magnetic induction coils are required. This leads to an increase in number of components and number of assembling steps, which is disadvantageous in the manufacturing cost.

Regarding the braking means of the rotor, it is described that the tightening force of the coil spring is determined by the revolution number of the driving member and the electromagnetic induction strength. Thus, the rotor which is rotated at a high speed must be disposed in a strong magnetic field. This increases the size of the stator and rotor, making it difficult to develop a lightweight, small electromagnetic spring clutch.

SUMMARY OF THE INVENTION

It is an object of the present invention to decrease the weight and size of an electromagnetic spring clutch by braking a rotor with electromagnetic induction caused between the stator and the rotor which is made of a hysteresis material.

More specifically, it is an object of the present invention to assemble the respective members sequentially in the radial direction, so that the sizes in the axial direction as well as in the radial direction are decreased, thereby decreasing the weight and size of an electromagnetic spring clutch.

It is another object of the present invention to provide an electromagnetic spring clutch whose operational characteristics are stabile in low-speed rotation.

It is still another object of the present invention to provide an electromagnetic spring clutch which does not require many excitation coils and magnetic induction coils and which has a small number of components.

In order to achieve the above objects, according to the present invention, there is provided an electromagnetic spring clutch comprising a stator formed with a central hole having an inner circumferential surface which is formed by a plurality of magnetic pole segments that mesh each other alternately through a gap in circumferential and axial directions, an excitation coil accommodated in the stator, an input-side rotating member and an output-side rotating member both made of a non-magnetic member and formed with fitting portions and coil tight-winding surfaces, the fitting portions respectively supporting two open end portions of the central hole of the stator, and the coil tight-winding surfaces having end portions that are in contact opposite to each other in the central hole, a coil spring wound on the coil tight-winding surfaces of the two rotating members and having one end hooked by the input-side rotating member, and a rotor by which the other end of the coil spring is hooked, which is disposed in a magnetic field of the stator, and which is made of a hysteresis material.

In the electromagnetic spring clutch having the above structure, the rotor is braked by utilizing a delay in polarity change of the rotor made of the hysteresis material, and this delay is electromagnetically induced by a magnetic flux generated upon energization of the excitation coil of the stator. In other words, the rotor is braked by utilizing the hysteresis loss of the rotor made of the hysteresis material. One end of the coil spring which is hooked by the rotor is also braked. By rotation of the input-side rotating member, the coil spring is tightly wound on the coil tight-winding surfaces of the respective rotating members. Thus, rotation is transmitted from the input-side rotating member to the output-side rotating member. When power supply to the excitation coil is disconnected, the magnetic flux disappears. Then, the braking force applied to the rotor and one end of the coil spring hooked by the rotor is released. The coil spring is restored by its own elasticity, thereby intermitting transmission of rotation from the input-side rotating member to the output-side rotating member.

The sectional area of each magnetic pole segment of the stator is gradually decreased toward its distal end in the axial direction. Thus, leakage of the magnetic flux that flows in the air gap between the meshing magnetic pole segments in the circumferential direction is decreased, so that the bypassing efficiency of the magnetic flux to the rotor disposed inside the stator in the radial direction is improved.

The input- and output-side rotating members are made of a plastic material, and the outer circumferential surfaces of the fitting portions of these two rotating members serve as the bearing surfaces of the stator. Then, the stator made of a metal material and the rotating members made of the plastic material slide on each other, eliminating the necessity of interposing a bearing, unlike in the conventional electromagnetic spring clutch.

DESCRIPTION OF THE PREFERRED EMBODIMENTS

Figure 1:
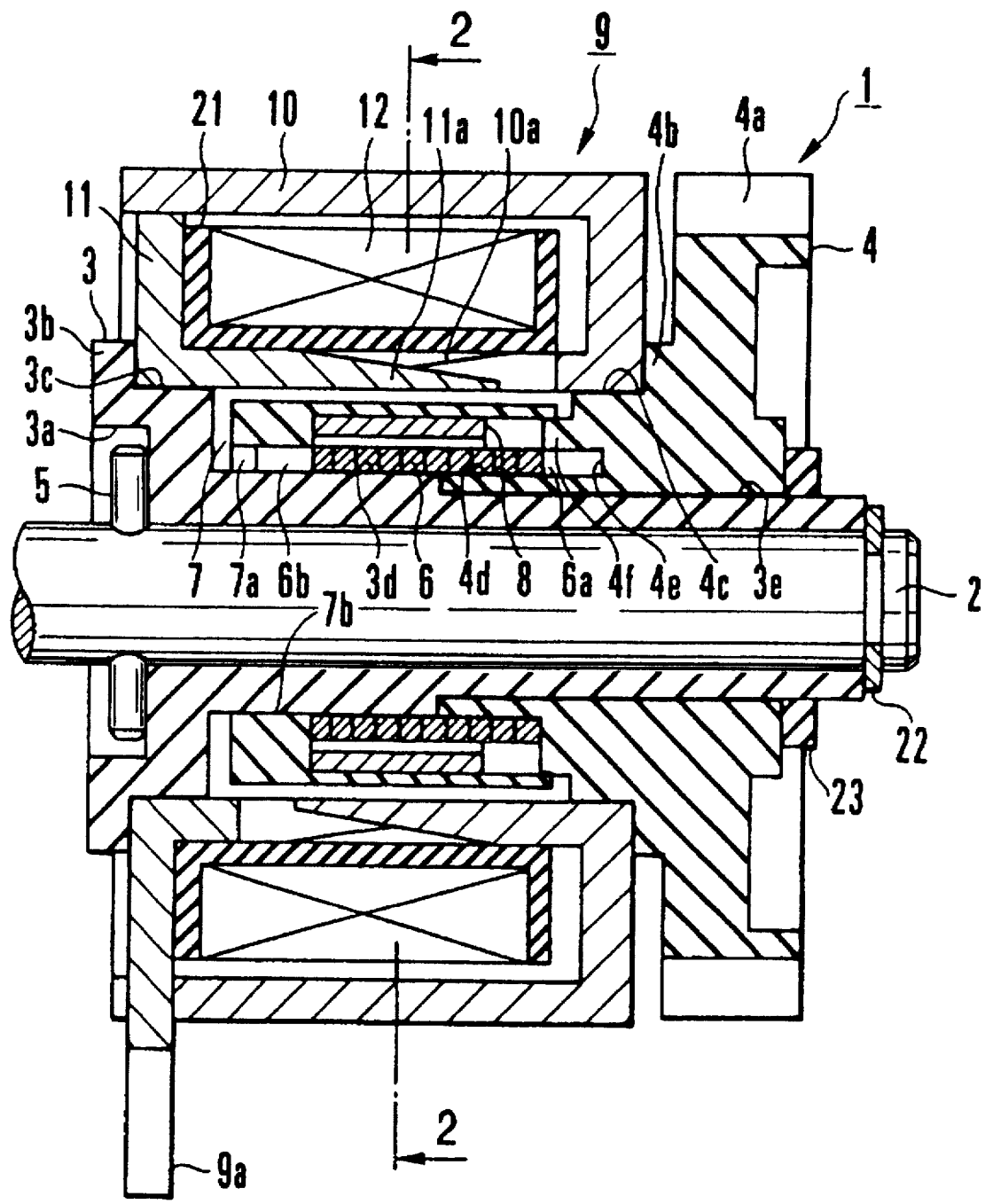
FIG. 1 is a sectional view showing an electromagnetic spring clutch according to an embodiment of the present invention.
Figure 2:
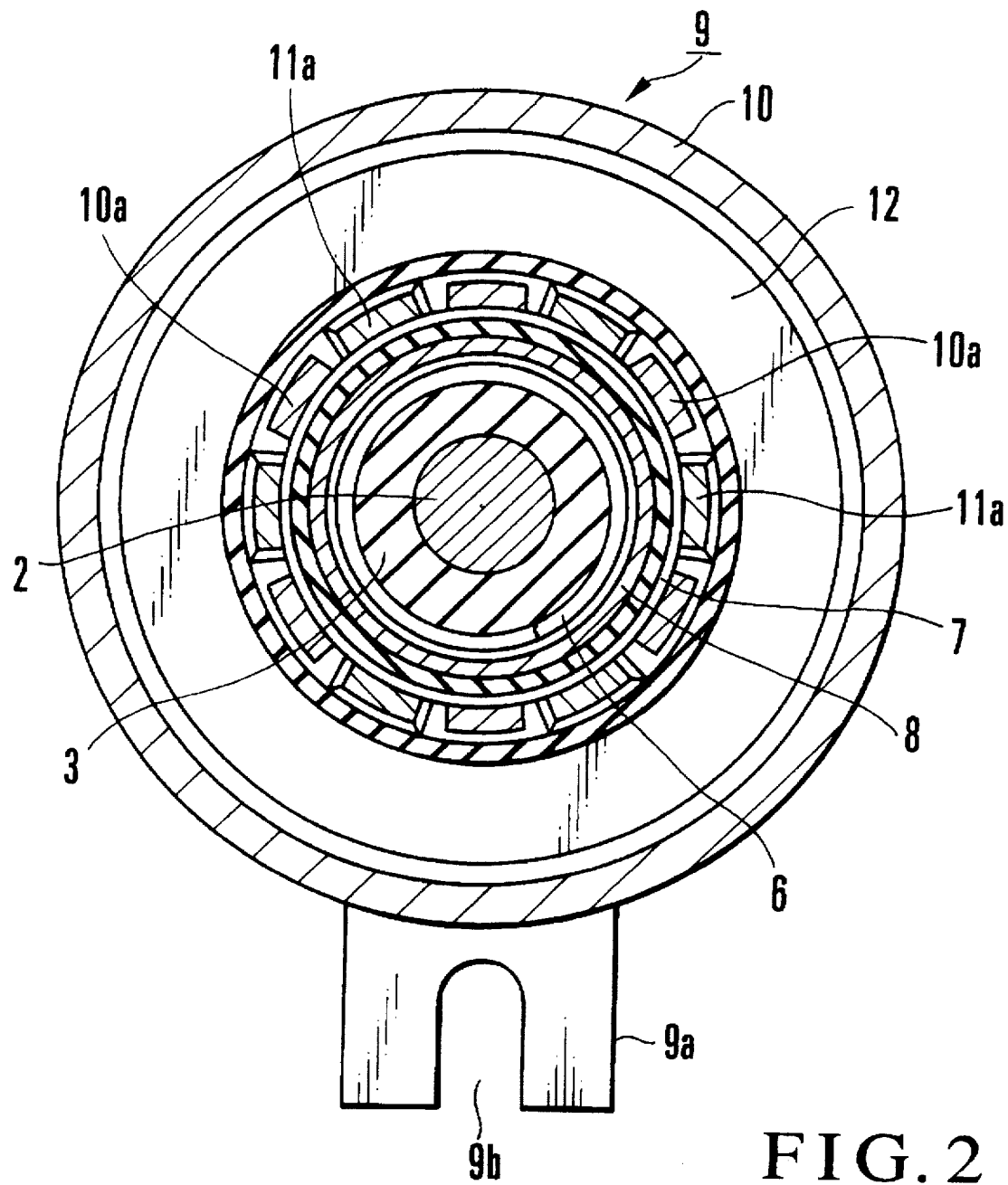
FIG. 2 is a sectional view taken along the line 2—2 of FIG. 1.
Figure 3:
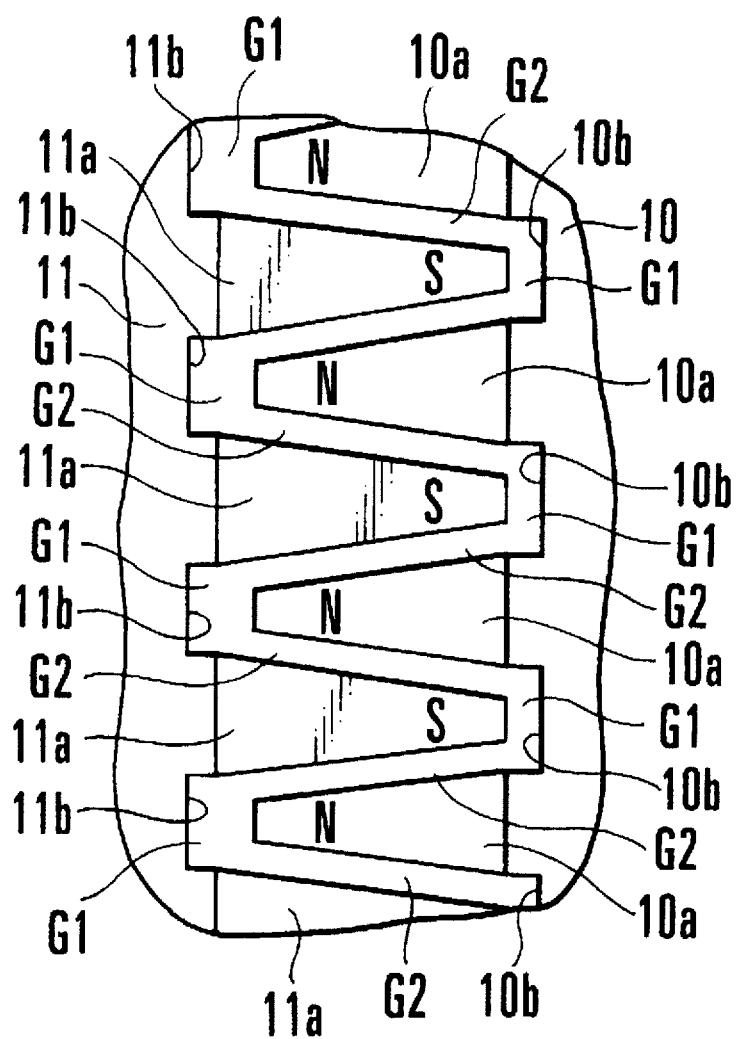
FIG. 3 is a developed view of magnetic pole segments.

FIG. 1 shows an electromagnetic spring clutch according to the present invention, FIG. 2 shows a section taken along the line A—A of FIG. 1, and FIG. 3 shows magnetic pole segments in development. An embodiment of the present invention will be described with reference to FIGS. 1 to 3.

An electromagnetic spring clutch 1 is axially supported on a rotating shaft 2 of a load machine (not shown). A pin provided to the load machine is engaged in a groove 9b of a rotation preventive member 9a projecting downward from a stator 9, thereby substantially fixing the electromagnetic spring clutch 1. More specifically, the electromagnetic spring clutch 1 including members to be described as follows is substantially held by the rotating shaft 2 rotatably supported by the bearing of the load machine. An input-side rotating member 4 integrally having a gear is rotatably supported by a hollow output-side rotating member 3 in which the rotating shaft 2 is inserted. The output-side rotating member 3 is made of a plastic material which is a non-magnetic material, and is constituted by a flange 3b having a recessed groove 3a, a cylindrical fitting portion 3c of the flange 3b, a coil tight-winding surface 3d, and a small-diameter cylindrical portion 3e. A pin 5 driven into the through hole of the rotating shaft 2 to be fixed therein is fitted in the recessed groove 3a. The flange 3b is formed on the outer side of the recessed groove 3a. A coil spring 6 to be described later is wound on the coil tight-winding surface 3d. The input-side rotating member 4 is rotatably supported on the small-diameter cylindrical portion 3e.

The input-side rotating member 4 is made of a synthetic material which is a non-magnetic material, similarly as the rotating member 3, and is formed with a toothed portion 4a, a boss 4b, a cylindrical fitting portion 4c, a coil tight-winding surface 4d, a hole 4e, and a small-diameter fitting portion 4f. The boss 4b opposes the flange 3b of the output-side rotating member 3 in the axial direction. The fitting portion 4c has the same outer diameter as that of the fitting portion 3c of the output-side rotating member 3. The coil tight-winding surface 4d has an outer diameter substantially the same as and, strictly, slightly larger than that of the coil tight-winding surface 3d of the output-side rotating member 3. The end portion of the coil tight-winding surface 4d is in contact opposite to the end portion of the coil tight-winding surface 3d. One end 6a of the coil spring 6 to be described later is inserted in the hole 4e. The small-diameter fitting portion 4f supports the opening portion of a cover member 7 to be described later.

The coil spring 6 made of a wire having a square section is tightly wound on the coil tight-winding surfaces 4d and 3d of the input- and output-side rotating members 4 and 3. A small gap of about 0.1 mm is defined between the inner circumferential surface of the coil spring 6 and the coil tight-winding surface 3d. One end 6a of the coil spring 6 is inserted in and thus hooked in the hole 4e of the input-side rotating member 4. The other end 6b of the coil spring 6 is inserted in and thus hooked in a notched groove 7a of the cylindrical cover member 7 to be described later.

The cover member 7 is made of a plastic material to have a small as possible a mass. A central hole 7b of the cover member 7 is rotatably fitted on the rotating member 3, and the opening portion of the cover member 7 is rotatably fitted on the small-diameter fitting portion 4f of the input-side rotating member 4. The cover member 7 is held such that its end faces in the axial direction will not in contact with the rotating members 3 and 4. A cylindrical rotor 8 made of a non-magnetized magnetic material is fixed in the cover member 7 by press fitting, so that it is accommodated in the cover member 7. The non-magnetized magnetic material includes flexible, semi-rigid, and rigid magnetic materials which are classified in accordance with the magnetic coercive force Hc indicated by a hysteresis loop and which are generally referred to as hysteresis materials. The rotor 8 of this embodiment employs a curling member made of a semi-rigid magnetic material. The rotor 8 made of the semi-rigid magnetic material and having the shape of a diameter-reducible cylinder is press-fitted in the cover member 7, so that it is fixed with its elastic restoration force.

The opening portion of the central hole of the stator 9 is rotatably fitted on the fitting portions 4c and 3c of the input- and output-side rotating members 4 and 3. The stator 9 is constituted by a first core 10 made of an annular member having an annular groove space open to its one end in the axial direction, and a second core 11 made of an annular member whose section is partly of a substantially L-letter shape, as shown in the section seen in the lower portion of FIG. 1. An excitation coil 12 wound on a coil bobbin 21 is stored in the annular space defined by the first and second cores 10 and 11. A plurality of magnetic pole segments 10a formed in the first core 10 and a plurality of magnetic pole segments 11a formed in the second core 11 oppose to mesh each other alternately through gaps in both the axial and circumferential directions. The inner circumferential surfaces of the magnetic pole segments 10a and 11a form the plurality of magnetic pole surfaces of the stator 9.

As shown in FIGS. 1 and 3, each of the magnetic pole segments 10a and 11a has a V shape which becomes gradually smaller as is closer to the distal end of its thickness in the radial and circumferential directions. Zigzag air gaps having a predetermined width are defined between the magnetic pole segments 10a and 11a. These air gaps form air gaps G1 between root portions 11b, which are between the distal ends of the magnetic pole segments 10a and the magnetic pole segments 11a, and root portions 10b between the distal ends of the magnetic pole segments 11a and the magnetic pole segments 10a in the axial direction, and air gaps G2 between the magnetic pole segments 10a and 11a in the circumferential direction. The magnetic resistance obtained by these air gaps G1 and G2 is set large. When the excitation coil 12 is energized, N and S magnetic pole surfaces are formed on the magnetic pole segments 10a and 11a, and the magnetic flux forms a magnetic circuit that bypasses from the N poles of the magnetic pole segments 10a to the rotor 8 and returns to the S poles of the magnetic pole segments 11a.

Note that reference numeral 22 denotes a snap ring which locks the rotating member 3; and 23, a removal preventive member which locks the rotating member 4. The removal preventive member 23 is press-mounted on the small-diameter cylindrical portion 3e of the rotating member 3.

To assemble the electromagnetic spring clutch 1 having the above structure, the coil spring member 7 cover member 7 having the rotor 8 are assembled in the output-side rotating member 3, and thereafter the central hole of the stator 9 is fitted on the fitting portion 3c of the rotating member 3.

Subsequently, the input-side rotating member 4 is fitted with the output-side rotating member 3, one end 6a of the coil spring 6 is hooked by the hole 4e of the rotating member 4, and the fitting portion 4c of the boss 4b is fitted in the central hole of the stator 9. The input-side rotating member 4 is prevented from being removed from the output-side rotating member 3 with the removal preventive member 23, thereby completing the assembly.

The electromagnetic spring clutch 1 is mounted on the rotating shaft 2 of the load machine (not shown), and its stator 9 is prevented from rotating as the pin of the load machine is locked in the groove 9b, so that the input-side rotating member 4 is meshed with the driving gear (not shown). In this state, when the electromagnetic spring clutch 1 is driven by a driving apparatus, the input-side rotating member 4, the coil spring 6, the cover member 7 by which one end of the coil spring 6 is hooked, and the rotor 8 idle on the output-side rotating member 3. When the excitation coil 12 is energized, its magnetic flux passes through the magnetic pole segments 10a, the rotor 8, and the magnetic pole segments 11a, so that the rotor 8 receives a braking force larger than the torsion load of the coil spring 6 and is braked. Thus, the winding diameter of the coil spring 6 is reduced so that the coil spring 6 is tightly wound on the coil tight-winding surfaces 4d and 3d. The rotation of the input-side rotating member 4 is transmitted to the output-side rotating member 3 against the braking force acting on the rotor 8, thereby rotating the rotating shaft 2. When energization to the excitation coil 12 is interrupted, braking on the rotor 8 is released. The winding diameter of the coil spring 6 is increased due to the elastic restoration force of the coil spring 6, so that the coil spring 6 is disengaged from the output-side rotating member 3, thereby disconnecting transmission of rotation to the rotating shaft 2.

Figure 4:
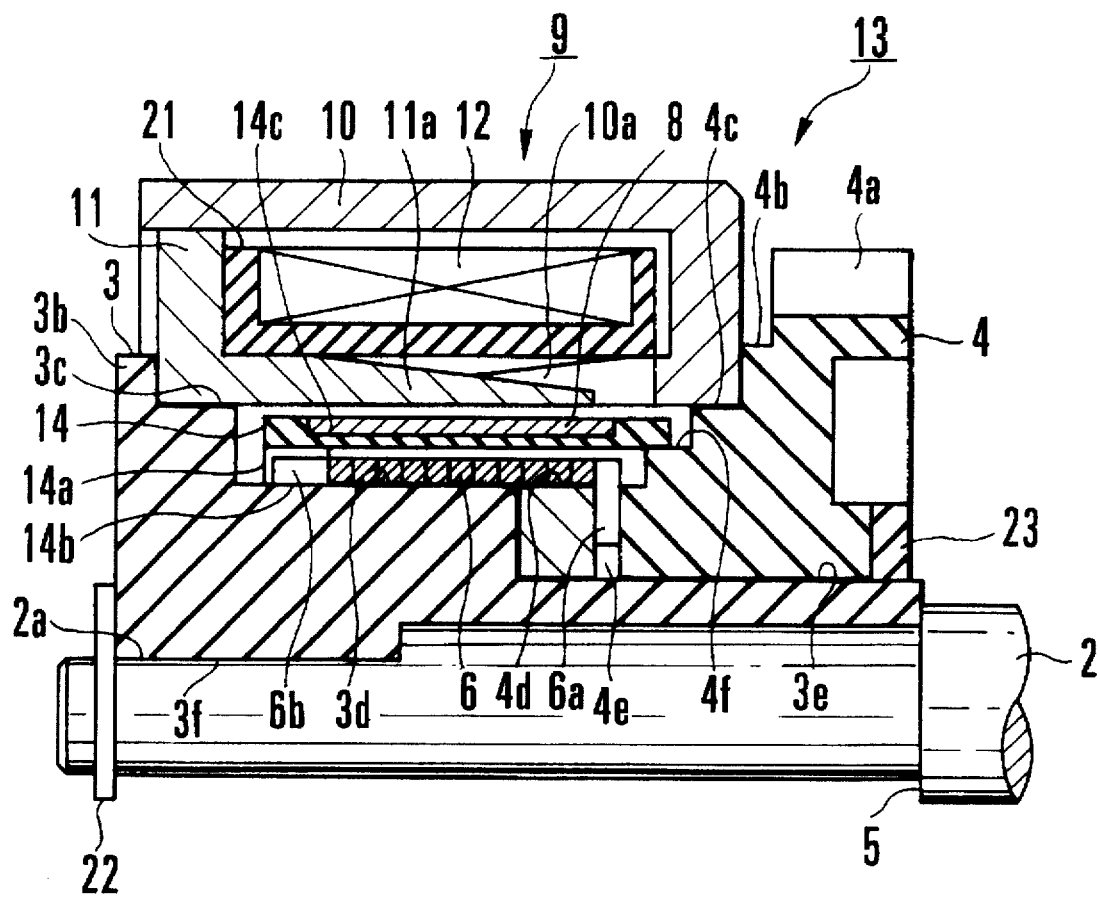
FIG. 4 is a sectional view of only the upper half of an electromagnetic spring clutch according to another embodiment of the present invention.

Another embodiment of the present invention will be described. FIG. 4 shows only the upper half of the electromagnetic spring clutch, in which members identical to those of the electromagnetic spring clutch 1 of FIG. 1 are denoted by the same reference numerals. Accordingly, only structures that are different from those of the above embodiment will be described.

An electromagnetic spring clutch 13 is mounted on a rotating shaft 2 having a locking flat surface portion 2a formed at its distal end. A D-shaped shaft hole 3f to engage with the flat surface portion 2a is formed at the central portion of an output-side rotating member 3. One end 6a of a coil spring 6 wound on coil tight-winding surfaces 3d and 4d is inserted in and hooked by a hole 4e opened in an input-side rotating member 4 in the radial direction.

The other end 6b of the coil spring 6 is inserted in and hooked by a notched groove 14a in a cover member 14 which is made of a plastic material to surround the coil spring 6. The cover member 14 has a central hole 14b which is rotatably fitted on the output-side rotating member 3, an opening portion which is rotatably fitted on a small-diameter fitting portion 4f of the input-side rotating member 4, and end faces in the axial direction which are supported not to contact the rotating members 3 and 4. Furthermore, an annular recessed groove 14c is formed in the outer circumferential surface of the cover member 14, and a rotor 8 made of a curling member of a semi-rigid magnetic material is fitted in the recessed groove 14c.

In the electromagnetic spring clutch 13 having the above structure, when an excitation coil 12 of a stator 9 is energized to brake the rotor 8, in the same manner as in the electromagnetic spring clutch 1 described above, the rotation of the input-side rotating member 4 is transmitted to the output-side rotating member 3, thereby rotating the rotating shaft 2.

In each electromagnetic spring clutch of the above embodiments, rotation is transmitted from the input-side rotating member 4 to the output-side rotating member 3. However, a structure in which rotation is transmitted from the rotating member 3 to the rotating member 4 is also possible if one end 6b of the coil spring 6 is hooked by the rotating member 3 and the other end 6a of the coil spring 6 is hooked by the rotor 8.

According to the electromagnetic spring clutch of the present invention, the rotor can be braked without being influenced by the revolution number of the driving member and the ampere-turn of the excitation coil. Accordingly, upon energization of the excitation coil, the coil spring is reliably tightly wound on the coil tight-winding surfaces of the input- and output-side rotating members, so that a stable operation of the electromagnetic spring clutch can be obtained.

The stator, rotor, coil spring, and input- and output-side rotating members are disposed such that they are sequentially assembled in the radial direction. Thus, the size of the electromagnetic spring clutch in the axial direction is largely decreased to decrease the weight and size, thereby providing an electromagnetic spring clutch at a low cost. Since the rotor and coil spring are disposed in an annular space defined by the stator and the respective rotating members, intrusion of dust from the outside is prevented, so that stable operational characteristics can be maintained over a long period of time.

The sectional area of each magnetic pole segment of the stator is gradually decreased toward its distal end in an axial direction. Thus, the bypassing efficiency of the magnetic flux flowing from the plurality of magnetic pole segments, that mesh each other alternately through the gaps in the circumferential direction, to the rotor becomes high, so that the ampere-turn of the excitation coil can be designed economically.

The input- and output-side rotating members are made of a plastic material, and the outer circumferential surfaces of the fitting portions serve as the bearing surfaces of the stator. Since a bearing member need not be particularly interposed, the outer size of the electromagnetic spring clutch becomes small, so that a lightweight, small electromagnetic spring clutch can be provided at a lower cost.

The rotor is fitted in a cover member to which one end of the coil spring is hooked and which is made of a plastic material. Thus, the moment of inertia of the rotor can be limited to a small value, and transmission of rotation can be disconnected quickly.

What is claimed is:

1. An electromagnetic spring clutch comprising:
   a stator formed with a central hole having an inner circumferential surface which is formed by a plurality of magnetic pole segments that mesh each other alternately through a gap in circumferential and axial directions;
   an excitation coil accommodated in said stator;
   an input-side rotating member and an output-side rotating member both made of a non-magnetic member and formed with fitting portions and coil tight-winding surfaces, said fitting portions respectively supporting two open end portions of the central hole of said stator, and said coil tight-winding surfaces having end portions that are in contact opposite to each other in the central hole;

a coil spring wound on said coil tight-winding surfaces of said two rotating members and having one end hooked by said input-side rotating member; and a rotor by which the other end of said coil spring is hooked, which is disposed in a magnetic field of said stator, and which is made of a hysteresis material.

2. An electromagnetic spring clutch according to claim 1, wherein each of said magnetic pole segments of said stator has a sectional area which is gradually decreased toward a distal end thereof in an axial direction.

3. An electromagnetic spring clutch according to claim 2, wherein said input- and output-side rotating members are made of a plastic material, and said fitting portions have outer circumferential surfaces that serve as bearing surfaces of said stator.

4. An electromagnetic spring clutch according to claims 1, 2 or 3, wherein said rotor is fitted in a cover member to which one end of said coil spring is hooked and which is made of a plastic material.

5. An electromagnetic spring clutch according to claim 1, wherein said stator is axially supported by said fitting portions of said input- and output-side rotating members, so that said rotor and said coil spring are disposed in a substantially closed space.

* * * * *